US008840965B2

(12) United States Patent
Ahn et al.

(10) Patent No.: US 8,840,965 B2
(45) Date of Patent: Sep. 23, 2014

(54) SILICON-CONTAINING MATERIALS WITH CONTROLLABLE MICROSTRUCTURE

(75) Inventors: Dongchan Ahn, Midland, MI (US); Jeremy M. Beebe, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/822,226

(22) PCT Filed: Oct. 14, 2011

(86) PCT No.: PCT/US2011/056273
§ 371 (c)(1),
(2), (4) Date: Mar. 11, 2013

(87) PCT Pub. No.: WO2012/051487
PCT Pub. Date: Apr. 19, 2012

(65) Prior Publication Data
US 2013/0178549 A1 Jul. 11, 2013

Related U.S. Application Data

(60) Provisional application No. 61/393,845, filed on Oct. 15, 2010.

(51) Int. Cl.
*B05D 3/02* (2006.01)
*C08J 3/00* (2006.01)
*C08F 30/08* (2006.01)
*C08G 77/452* (2006.01)
*C09D 183/08* (2006.01)
*C09D 183/10* (2006.01)
*B05D 3/00* (2006.01)
*C09D 183/14* (2006.01)
*C08G 77/54* (2006.01)

(52) U.S. Cl.
CPC ............ *C09D 183/08* (2013.01); *C08G 77/452* (2013.01); *C09D 183/10* (2013.01); *B05D 3/007* (2013.01); *C09D 183/14* (2013.01); *C08G 77/54* (2013.01)
USPC ........... 427/387; 526/196; 526/197; 526/198; 526/217; 526/235; 526/236; 526/279; 427/337; 528/481; 528/490

(58) Field of Classification Search
None
See application file for complete search history.

(56) References Cited

U.S. PATENT DOCUMENTS

| 3,649,582 A | 3/1972 | Wesp |
| 4,483,973 A | 11/1984 | Lucas et al. |
| 4,861,906 A * | 8/1989 | Varaprath et al. ............ 556/419 |
| 5,403,535 A | 4/1995 | Blizzard et al. |
| 5,760,116 A | 6/1998 | Kilgour et al. |
| 5,807,921 A | 9/1998 | Hill et al. |
| 5,879,436 A | 3/1999 | Kramer et al. |
| 6,204,403 B1 * | 3/2001 | Pepe et al. .................... 556/419 |
| 6,514,584 B1 | 2/2003 | Merlin et al. |
| 6,770,708 B2 | 8/2004 | Kadlec et al. |
| 6,962,955 B2 * | 11/2005 | Kusudou et al. ................ 525/56 |
| 7,649,068 B2 | 1/2010 | Ahn |
| 7,732,543 B2 * | 6/2010 | Loch et al. .................... 526/196 |
| 2002/0198338 A1 * | 12/2002 | Chung .......................... 526/131 |
| 2003/0124564 A1 | 7/2003 | Trau et al. |
| 2005/0013925 A1 | 1/2005 | Cabey et al. |
| 2008/0050552 A1 | 2/2008 | Ahn |
| 2008/0085983 A1 | 4/2008 | Ahn |

FOREIGN PATENT DOCUMENTS

| EP | 1018362 | 7/2000 |
| WO | 97/01606 | 1/1997 |
| WO | 98/31541 | 7/1998 |
| WO | 03/002633 | 1/2003 |
| WO | 2006/073695 | 7/2006 |
| WO | 2006/073696 | 7/2006 |
| WO | 2007/040794 | 4/2007 |
| WO | 2008/085234 | 7/2008 |

OTHER PUBLICATIONS

Arkles, Barry. "Hydrophobicity, Hydrophilicity and Silane Surface Modification." Gelest, Inc. [online], 2006 [retrieved on Jul. 23, 2013] Retrieved from the Internet: <URL: http://www.gelest.com/goods/pdf/Hydrophobicity.pdf> (76 pages).
Arkles, Barry. "Silane Coupling Agents: Connecting Across Boundaries v. 2.0." Gelest, Inc. [online], 2006 [retrieved on Jul. 23, 2013] Retrieved from the Internet: <URL: http://www.gelest.com/goods/pdf/couplingagents.pdf> (60 pages).
Bhatnagar, P. et al. "Integrated Reactive Ion Etching to Pattern Cross-linked Hydrophilic Polymer Structures for Protein Immobilization." Applied Physics Letters. vol. 90, 144107 (3 pages), (Apr. 2007).
Smarsly, B. et al. "Preparation and Characterization of Mesostructured Poylmer-Functionalized Sol-Gel-Derived Thin Films." Progress in Organic Coatings. vol. 47, pp. 393-400, 2003 (8 pages).
Yagci, B. et al. "Synthesis and Photopolymerizations of New Crosslinkers for Dental Applications." Macromolecular Materials and Engineering. vol. 291, No. 4, pp. 336-344, Apr. 7, 2006 (9 pages).
Zhang, X. et al. "Evaporation-Induced Self-Assembly of Organic-Inorganic Ordered Nanocomposite Thin Films That Mimic Nacre." Material Letters. vol. 60, No. 17-18, Aug. 2006, pp. 2086-2089 (4 pages).
"Micro-Particle Surface Modification: Innovating Particle Functionalization." Gelest, Inc. [online], 2009 [retrieved on Jul. 23, 2013] Retrieved from the Internet: <URL: http://www.gelest.com/goods/pdf/Micro-Particle.pdf> (6 pages).

(Continued)

*Primary Examiner* — Marc Zimmer
(74) *Attorney, Agent, or Firm* — Nixon Peabody LLP

(57) ABSTRACT

In various embodiments, provided are silicon-containing coatings; silicon-containing coatings comprising microstructures that are responsive to one or more stimuli; oxidized products of said silicon-containing coatings; bulk solids; oxidized solids and powders; methods of preparing such coatings, solids, and powders; and substrates comprising the provided coatings.

20 Claims, 12 Drawing Sheets

(56) References Cited

OTHER PUBLICATIONS

Lowell, S. et al. "Classification of Adsorption Isotherms." In: Lowell, S., *Characterization of Porous Solids and Powders: Surface Area, Pore Size and Density*. (Springer, The Netherlands, 2004) pp. 12-13 (2 pages).

International Search Report and Written Opinion mailed Feb. 16, 2012 which issued in corresponding International Patent Application No. PCT/US2011/056273 (10 pages).

* cited by examiner

A

B

A

B

US 8,840,965 B2

SILICON-CONTAINING MATERIALS WITH CONTROLLABLE MICROSTRUCTURE

CROSS-REFERENCE TO RELATED APPLICATIONS

This application is a U.S. National Stage of International Application No. PCT/US2011/056273, filed Oct. 14, 2011, which claims the benefit of U.S. Provisional Application No. 61/393,845, filed Oct. 15, 2010 each of which are hereby incorporated by reference herein in their entireties.

TECHNICAL FIELD

The present application relates to silicon-containing coatings; silicon-containing coatings comprising stimuli-responsive microstructures; oxidized products of such silicon-containing coatings; oxidized solids and powders; methods of preparing said coatings, solids, and powders; and substrates comprising the provided coatings.

BACKGROUND

Silicon based sol-gel coatings have received considerable research because of their advantages in chemical and thermal stability coupled with their ability to be processed as low viscosity liquids. Sol-gel processes have been combined with organic compounds such as surfactants or block copolymers, which act as sacrificial templates in the formation of porous inorganic materials when the organic materials are selectively removed by thermal or chemical means. To change the microstructure of the sol-gel based coatings, typically a different formulation containing either different amounts of the organic template or an altogether different organic additive is required.

Some known polymer coatings can respond to stimuli such as moisture or pH. Such materials may be useful for providing a mechanical response to a change in the environment for diverse applications, including sensors and active coatings. Although various methods of depositing sol-gel coatings are known, and various methods of producing stimuli-responsive microstructured polymer films are known, there remains a need in the art for cost-effective methods of creating silicon-based coatings. Additionally, there is need for methods and materials that allow the microstructure of such silicon-based coatings to be controlled by exposure to at least one stimulus. Moreover, there is need for coatings having a fine pore structure, wherein preparation of such coatings can be achieved without additives such as surfactants and block copolymers.

SUMMARY

These needs are met by the described embodiments, which provide silicon-containing coatings, solids, and powders; methods of forming such materials; and substrates comprising the provided coatings.

In various embodiments, the provided methods comprise: (I) reacting an amine-reactive compound having at least one free-radical polymerizable group per molecule with a silane having the formula:

$(R^1{}_2NR^2)_a SiR^3{}_b(OR^4)_{4-(a+b)}$ wherein a=1, 2, or 3; b=0, 1, 2, or 3; a+b=1, 2, 3, or 4; R1 is independently selected from hydrogen, C1-C12 alkyl, halogen-substituted C1-C12 alkyl, C1-C12 cycloalkyl, aryl, nitrogen-substituted C1-C12 alkyl, and aliphatic ring structures which bridge both $R^1$ units and can be N-substituted; $R^2$ is independently selected from C1-C30 alkyl; $R^3$ is independently selected from hydrogen, halogen, C1-C12 alkyl, halogen-substituted C1-C12 alkyl, and $-OSiR^{3'}{}_3$, wherein $R^{3'}$ is selected from C1-C12 alkyl, and halogen-substituted C1-C12 alkyl; and $R^4$ is independently selected from hydrogen, C1-C12 alkyl, and halogen-substituted C1-C12 alkyl to form a reaction product; wherein the reaction may optionally occur in the presence of at least one optional solvent to form a reaction product that is soluble in the at least one optional solvent; and (II) reacting the reaction product of (I) with an organoborane free-radical initiator in the presence of oxygen to form a polymer preparation. The polymer preparation of (II) may be a solid; a liquid; or if the reaction of (I) occurs in the presence of at least one optional solvent, a dispersion. The polymer preparation of (II) may be used to prepare one or more of the provided coatings, solids, and powders.

In some embodiments, the polymer preparation of (II) is treated with heat, acid, or combinations thereof to form an oxidized solid, oxidized powder, or both. The oxidized power and oxidized solid may be porous, and in some embodiments, may be microporous or substantially microporous. In alternative embodiments, the polymer preparation of (II) is contacted with at least one substrate surface to form a non-porous or semi-porous silicon-containing coating on the surface. In some embodiments, said silicon-containing coating comprises microstructures that are responsive to one or more stimuli. In some embodiments, the provided methods further comprise treating the silicon-containing coating formed with heat, acid, or combinations thereof to form an oxidized coating. The oxidized coating may be porous, and in some embodiments, may be microporous or substantially microporous.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

Figure 1:
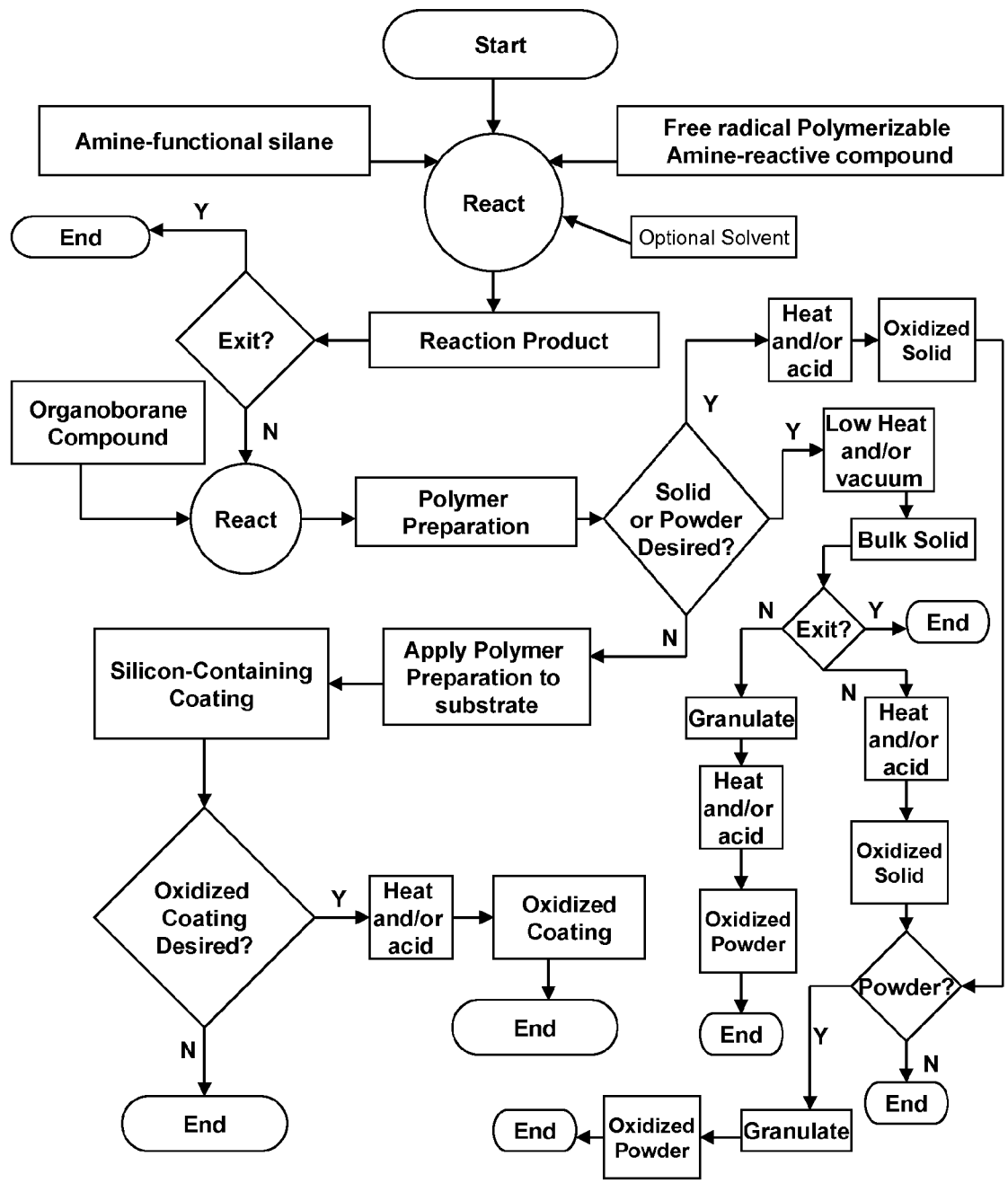
FIG. 1 is a flow chart describing the steps of various embodiments.
Figure 2A:
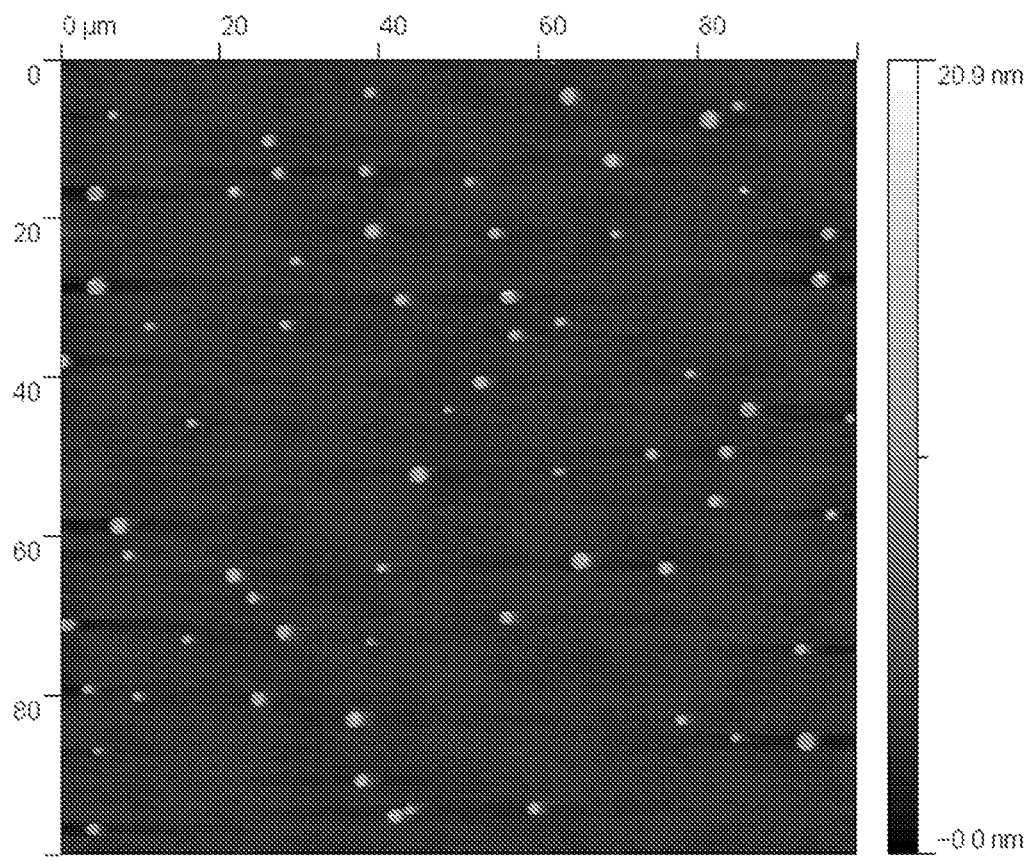
FIG. 2 depicts atomic force microscopy (AFM) height images of the silicon-containing microstructured film prepared in Example 1: images A and B show the presence of fairly uniform microstructures that are approximately 7 nm tall and 13 μm diameter; C illustrates that the microstructures are cylindrical in shape; phase image D shows significant contrast between the cylinders and the matrix, wherein darker contrast in the image is generally indicative of a softer and/or stickier material.
Figure 2B:
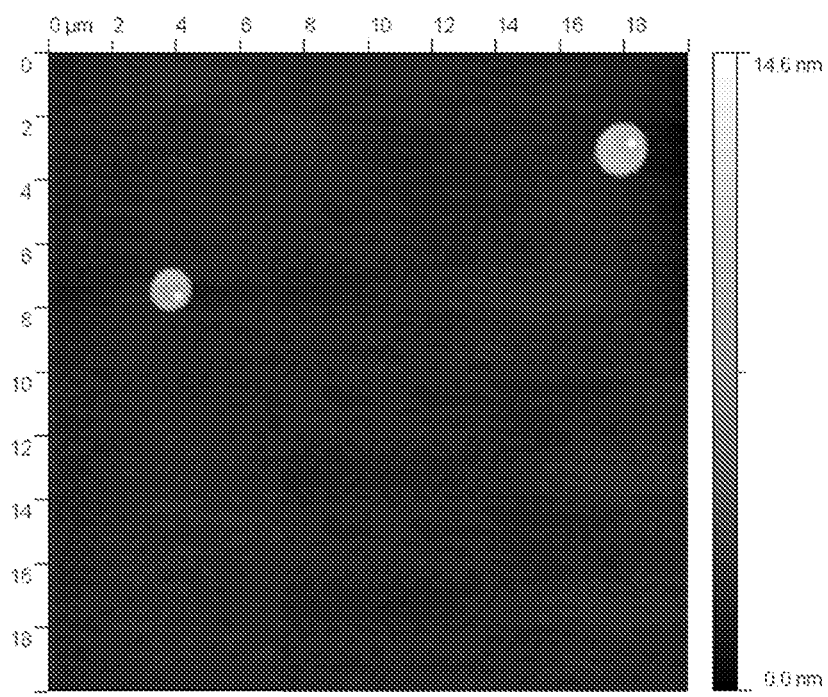
Figure 2C:
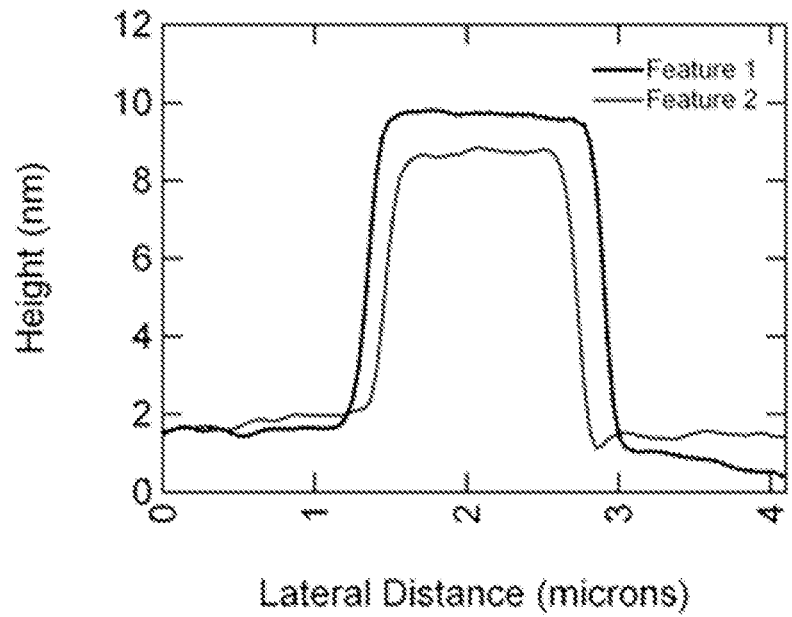
Figure 2D:
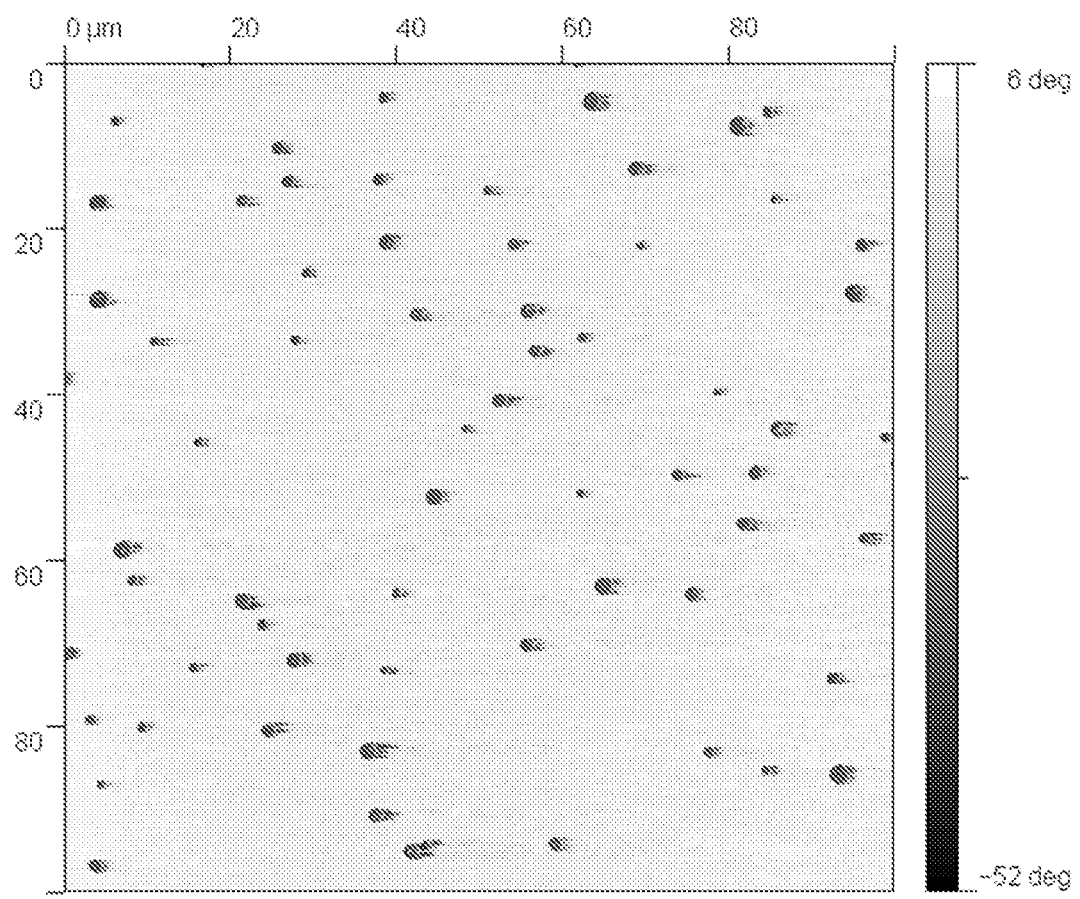

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

Unless otherwise indicated, all numbers expressing quantities of ingredients, properties such as molecular weight, reaction conditions, and so forth as used in the specification and claims are to be understood as being modified in all instances by the term "about." Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used herein and the appended claims, the term "coating" is intended to include, but not be limited to, films.

As used herein and the appended claims, the term "dispersion" is intended to refer to polymer particles dispersed, suspended, dissolved, or partially dissolved in at least one suitable solvent. A dispersion may be a reaction product, or it may be formed by dispersing a reaction product in at least one solvent.

The terms "microstructures" and "microstructured," as used herein and the appended claims, are intended to describe materials having compositional and/or structural heterogeneities with features having an average characteristic length scale of less than 1 mm. When referring to a surface, the terms refer to compositional and or structural heterogeneities with features having an average characteristic length scale of less than 1 mm that are detectable on the surface of a material by any of the various experimental surface analytical techniques such as atomic force microscopy, scanning electron microscopy, transmission electron microscopy, optical microscopy, profilometry, energy dispersive spectroscopy, and x-ray photoelectron spectroscopy. The features of materials with "surface microstructures" or "microstructured surfaces" are distinct from any surface roughness or features of the underlying substrate (or surface) on which the materials are applied.

Unless the context clearly indicates otherwise, the term "porous" is used herein and in the appended claims to mean one or more of microporous (mean pore diameter of less than 2 nm), mesoporous (mean pore diameter of from about 2-50 nm), and macroporous (mean pore diameter of greater than 50 nm).

As used herein and the appended claims, the term "powder" is intended to mean granulated particles of a bulk solid.

The terms "solid" and "bulk solid," as used herein and the appended claims, are intended to mean a solid that can be further granulated into particles of any size and shape distribution.

In various embodiments, provided are silicon-containing coatings, solids, and powders (collectively, "materials"). In some embodiments, provided are silicon-containing coatings, wherein said coatings may be non-porous or semi-porous and may, in some embodiments, comprise microstructures that are responsive to one or more stimuli. In some embodiments, said silicon-containing coatings may be treated to form the provided porous oxidized coatings. Additionally provided are porous oxidized solids and powders. In addition to the provided coatings, solids, and powders, also provided are methods of preparing such materials. Additionally, substrates comprising the provided coatings are also provided.

In the various embodiments, provided are methods of preparing silicon-containing materials, comprising: (I) reacting an amine-reactive compound having at least one free-radical polymerizable group per molecule with a silane having the formula:

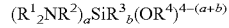

wherein a=1, 2, or 3; b=0, 1, 2, or 3; a+b=1, 2, 3, or 4; $R^1$ is independently selected from hydrogen, C1-C12 alkyl, halogen-substituted C1-C12 alkyl, C1-C12 cycloalkyl, aryl, nitrogen-substituted C1-C12 alkyl, and aliphatic ring structures which bridge both $R^1$ units and can be N-substituted; $R^2$ is independently selected from C1-C30 alkyl; $R^3$ is independently selected from hydrogen, halogen, C1-C12 alkyl, halogen-substituted C1-C12 alkyl, and —$OSiR^{3'}_3$, wherein $R^{3'}$ is selected from C1-C12 alkyl, and halogen-substituted C1-C12 alkyl; and $R^4$ is independently selected from hydrogen, C1-C12 alkyl, and halogen-substituted C1-C12 alkyl to form a reaction product; wherein the reaction optionally occurs in the presence of at least one optional solvent to form a reaction product that is soluble in the at least one optional solvent; and (II) reacting the reaction product of (I) with an organoborane free-radical initiator in the presence of oxygen to form a polymer preparation. The polymer preparation of (II) may be used to prepare one or more of the provided coatings, solids, and powders. If the reaction of (I) occurs in the presence of an optional solvent, the polymer preparation of (II) may be a dispersion in which the polymers formed are dispersed, suspended, dissolved, or partially dissolved in the optional solvent. If the reaction of (I) does not occur in the presence of an optional solvent, the polymer preparation of (II) may be a liquid or solid. In some embodiments, a dispersion of the liquid or solid in at least one suitable solvent may need to be prepared in order to form the provided coatings.

In some embodiments, the provided methods further comprise treating the polymer preparation of (II) with heat, acid, or combinations thereof to form an oxidized solid, an oxidized powder, or combinations thereof. The oxidized solids and powders formed may be used in a variety of applications. They are also porous, and in some embodiments, are microporous or substantially microporous.

In some embodiments, the polymer preparation of (II) is directly treated with acid, heat, or both to form an oxidized solid. For example, the polymer preparation of (II) may be treated with high heat or strong acid. As another example, the polymer preparation of (II) may be treated with strong acid and low heat. The oxidized solid formed may be granulated to form an oxidized powder.

In some embodiments, the polymer preparation of (II) is heated to evaporate the solvent of a dispersion polymer preparation or otherwise solidify a liquid polymer preparation, optionally in the presence of a vacuum, to form a bulk solid. The bulk solid can, in some embodiments, be further treated with acid, heat, or both to form an oxidized solid. For example, the bulk solid can be treated with high heat or strong acid. As another example, the bulk solid can be treated with strong acid and low heat. The oxidized solid formed may be granulated to form an oxidized powder.

In some embodiments, the polymer preparation of (II) is heated to evaporate the solvent of a dispersion polymer preparation or otherwise solidify a liquid polymer preparation, optionally in the presence of a vacuum. The bulk solid formed can be granulated to form a powder. The powder formed may be further treated with acid, heat, or both to form an oxidized powder. For example, the powder can be treated with high heat or strong acid. As another example, the powder can be treated with strong acid and low heat.

In alternative embodiments, the provided methods comprise contacting at least one substrate surface with the polymer preparation of (II) and, if necessary drying, to form a non-porous or semi-porous silicon-containing coating. Drying may be achieved through air drying, low heat, vacuum, or combinations thereof. If the polymer preparation of (II) is a liquid or solid, it may be necessary to disperse, suspend, dissolve, or partially dissolve the polymer preparation in at least one suitable solvent in order to adequately form the coating on the substrate. A suitable solvent may be, but is not required to be, selected from the at least one optional solvent of (I). In some embodiments, the coatings formed are films. In some embodiments, the films are stand-alone films prepared on a sacrificial substrate.

The non-porous or semi-porous silicon-containing coatings, as well as the bulk solid, formed by the provided methods may comprise microstructures that are responsive to one or more stimuli. The microstructures may, in some embodiments, be protrusions from the coating or solid surface. In some embodiments, the microstructures may exist beneath the surface as phase separated domains. In some embodiments, the provided coatings and bulk solids may respond to one or more stimuli by increasing surface roughness; decreasing surface roughness; changing microstructure protrusion size, shape, or both; change of protrusions to lamellar microstructures; change in the size, shape, or both of sub-surface microstructures; or combinations thereof. Examples of stimuli that can illicit a response in the provided silicon-containing coatings and bulk solids include, but are not limited to, humidity, pH, and temperature.

In some embodiments, the provided methods further comprise treating the non-porous or semi-porous silicon-containing coatings with heat, acid, or both to form oxidized coatings. The properties of such oxidized coatings are, at least partially, dependent upon the nature of the non-porous or semi-porous silicon-containing. The oxidized coatings prepared by the provided methods are porous, and in some embodiments, are microporous or substantially microporous. In some embodiments, the oxidized coatings formed are films. In some embodiments, the films are stand-alone films.

In various embodiments, also provided are the coated substrates prepared according to the provided methods. Thus, in some embodiments, provided are coated substrates comprising: (i) at least one silicon-containing coating on at least one substrate surface; (ii) at least one silicon-containing on at least one substrate surface wherein the coating comprises stimuli-responsive microstructures; (iii) at least one oxidized coating on at least one substrate surface, or (iv) combinations thereof.

Amine-Reactive Compounds

The provided methods of preparing silicon-containing materials comprise reacting an amine-reactive compound having at least one free-radical polymerizable group per molecule with an amine-functional silane. The amine-reactive compound may be a small molecule, a monomer, an oligomer, a polymer, or a mixture thereof. The amine-reactive compound may be an organic, or organopolysiloxane compound. In addition to comprising at least one free-radical polymerizable group per molecule, the provided amine-reactive compound may also comprise additional functional groups, such one or more hydrolyzable groups.

In some embodiments, amine-reactive compounds may be selected from mineral acids, Lewis acids, carboxylic acids, carboxylic acid derivatives such as anhydrides and succinates, carboxylic acid metal salts, isocyanates, aldehydes, epoxides, acid chlorides and sulphonyl chlorides. Examples of amine-reactive compounds having at least one free radical polymerizable group include, but are not limited to, acrylic acid, methacrylic acid, 2-carboxyethyl acrylate, 2-carboxyethylmethacrylate, methacrylic anhydride, acrylic anhydride, acryloyl chloride, methacryloyl chloride, undecylenic acid, methacryloylisocyanate, 2-(methacryloyloxy)ethyl acetoacetate, undecylenic aldehyde, dodecyl succinic anhydride, glycidyl acrylate and glycidyl methacrylate.

In some embodiments, it is contemplated that the amine-reactive compound may be an organosilane or organopolysiloxane oligomers bearing one or more amine-reactive groups and at least one free radical polymerizable group. Examples include, but are not limited to, silanes and oligomeric organopolysiloxanes bearing both an acrylic functional group such as methacryloxypropyl and amine reactive group such as carboxypropyl, carboxydecyl or glycidoxypropyl. Routes to synthesizing such compounds by functionalization of the corresponding silicon hydride or silicon alkoxide functional silanes or organopolysiloxane oligomers are known to one of skill in the art.

While numerous amine-reactive compounds are contemplated to be useful with the provided methods, one of skill in the art will recognize that the selection of a specific free radical polymerizable amine-reactive compound will depend upon, among other things, the nature of the amine-functional silane and the desired reaction product. In some embodiments, the amine-reactive compound may be selected from acrylic acid, methacrylic acid, 2-carboxyethylacrylate, 2-carboxyethylmethacrylate, acryloyl chloride, methacryloyl chloride, glycidyl acrylate and glycidyl methacrylate. Good results have been obtained when the amine-reactive compound used in the provided methods is selected from acrylic acid, methacrylic acid, and methacryloyl chloride.

In optional embodiments, it may also be desirable to react at least one additional amine-reactive compound with the amine-functional silane. For example, in addition to the amine-reactive compound described above, it may be desirable to introduce a second amine-reactive compound having at least one free-radical polymerizable group per molecule to assist in completing the desired reaction. As another example, it may be desirable to introduce an amine-reactive compound without a free-radical polymerizable group to assist in completing the desired reaction. Examples of such optional second amine reactive compounds include, but are not limited to, acetic acid, citric acid, hydrochloric acid, maleic anhydride, dedecyl succinic anhydride, 3-isocyantopropyltriethoxysilane, 3-isocyanato propyltrimethoxysilane, and (isocyanatomethyl)methyldimethoxysilane.

Amine-Functional Silane

The provided methods of preparing silicon-containing microstructured materials comprise reacting an amine-reactive compound with one or more amine-functional hydrolysable silanes having the formula:

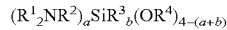

$$(R^1{}_2NR^2)_a SiR^3{}_b (OR^4)_{4-(a+b)}$$

wherein a=1, 2, or 3; b=0, 1, 2, or 3; a+b=1, 2, 3, or 4; $R^1$ is independently selected from hydrogen, C1-C12 alkyl, halogen-substituted C1-C12 alkyl, C1-C12 cycloalkyl, aryl, nitrogen-substituted C1-C12 alkyl, and aliphatic ring structures which bridge both $R^1$ units and can be N-substituted; $R^2$ is independently selected from C1-C30 alkyl; $R^3$ is independently selected from hydrogen, halogen, C1-C12 alkyl, halogen-substituted C1-C12 alkyl, and —$OSiR^{3'}{}_3$, wherein $R^{3'}$ is selected from C1-C12 alkyl, and halogen-substituted C1-C12 alkyl; and $R^4$ is independently selected from hydrogen, C1-C12 alkyl, and halogen-substituted C1-C12 alkyl.

Examples of groups represented by $R^1$ include, but are not limited to, methyl, ethyl, n-propyl, isopropyl, n-butyl, isobutyl, sec-butyl, t-butyl, and cyclohexyl groups, and halogenated derivatives thereof. $R^1$ may also be N-(2-aminoethyl), N-(6-aminohexyl), or N-3-(aminopropylenoxy). Additionally two $R^1$ groups may be bridged through a cyclic ring, which when included with the N can form a pyridyl, pyrrole or azole substituent. Examples of groups represented by $R^2$ include, but are not limited to, vinyl, allyl, isopropenyl, n-butenyl, sec-butenyl, isobutenyl, and t-butenyl groups, and halogenated derivatives thereof. Examples of groups represented by $R^3$ include, but are not limited to, hydrogen, halogen, methyl, ethyl, n-propyl, isopropyl, n-butyl, isobutyl, sec-butyl, t-butyl groups, trimethylsiloxy, triethylsiloxy, and halogenated derivatives thereof. Examples of groups represented by $R^4$ include, but are not limited to, methyl, ethyl, n-propyl, isopropyl, n-butyl, isobutyl, sec-butyl, and t-butyl groups, and halogenated derivatives thereof.

The provided silanes comprise at least one "hydrolyzable group," which is any group attached to silicon that may undergo a hydrolysis reaction. Suitable groups include, but are not limited to, hydrogen, halogen, and alkoxy groups.

Examples of suitable amine-functional silanes for use in the provided methods include, but are not limited to, aminomethyltriethoxysilane; aminomethyltrimethoxysilane; 3-aminopropyltriethoxysilane; 3-aminopropyltrimethoxysilane; 3-aminopropylmethyldimethoxysilane; 3-aminopropylmethyldiethoxysilane; 3-aminopropylethyldimethoxysilane; 3-aminopropylethyldiethoxysilane; 3-aminopropyl dimethylmethoxysilane; 3-aminopropyldiethylmethoxysilane; 3-aminopropyl dimethylethoxysilane; 3-aminopropyldiethylethoxysilane; n-butylaminopropyltrimethoxysilane; 4-aminobutyltriethoxysilane; 4-aminebutyltrimethoxysilane; aminophenyltrimethoxysilane; N,N-diethyl-3-aminopropyltrimethoxysilane; N-(2-aminothyl)-3-aminopropyltrimethoxysilane; 3-aminopropyl trimethylsilane, m-aminophenyltrimethoxysilane, p-aminophenyltrimethoxysilane, 11-aminoundecyltriethoxysilane; 2-(4-pyridylethyl) triethoxysilane, and 3-aminopropyltris(trimethylsiloxy)silane. Further examples of other amine functional compounds suitable for use in the provided methods can be found listed between pages 28-35 in the Gelest catalog entitled "Silane Coupling Agents: Coupling Across Boundaries Version 2.0," appearing under the category of "Amino Functional Silanes," and include compounds listed in the sub-categories of monoamine functional silanes (trialkoxy, monoamine functional silanes; water borne, monoamine functional silanes; dialkoxy, monoamine functional silanes); diamine functional silanes (monoalkoxy, diamine functional silanes; trialkoxy, diamine functional silanes; water borne, diamine functional silanes; dialkoxy, diamine functional silanes); monoalkoxy, triamine functional silanes; secondary amine functional silanes; tertiary amine functional silanes; quaternary amine functional silanes; dipodal amine functional silanes; specialty amine functional silanes; and cyclic azasilanes. Good results have been obtained with the use of 3-aminopropyltriethoxysilane, n-butylaminopropyltrimethoxysilane, N,N-diethyl-3-aminopropyltrimethoxysilane, and 3-aminopropyltris(trimethylsiloxy)silane.

Optional Solvent

The provided methods of preparing silicon-containing materials comprise reacting an amine-reactive compound with an amine-functional silane to form a reaction product. In some embodiments, the reaction may optionally occur in the presence of at least one solvent to form a reaction product that is soluble in the optional solvent.

In some embodiments, the solvent may be selected from toluene, xylene, linear siloxanes, cyclosiloxanes, hexamethyldisiloxane, octamethyltrisiloxane, pentamethyltetrasiloxane, ethyl acetate, propylene glycol methyl ether acetate (PGMEA), di(propyleneglycol)dimethyl ether, methylethyl ketone, methylisobutylketone, methylene chloride, tetrahydrofuran, 1,4-dioxane, N-methylpyrollidone, N-methylformamide, dimethylsulfoxane, N,N-dimethylformamide, propylene carbonate, water, and combinations thereof. Good results have been obtained with the use of toluene, hexamethyldisiloxane, octamethyltrisiloxane, pentamethyltetrasiloxane and PGMEA.

Organoborane Free-Radical Initiator

The provided methods of preparing silicon-containing microstructured materials comprise reacting a free radical polymerizable amine-reactive compound with an amine-functional silane to form a reaction product, and reacting said reaction product with an organoborane free-radical initiator in the presence of oxygen to form a polymer material that may be used as a precursor for forming microstructured coatings, films, solids, and powders. In some embodiments, the reaction of the amine-reactive compound with the amine-functional silane occurs in the presence of an optional solvent, and the polymer material formed upon further treatment with the organoborane is dispersed, suspended, dissolved, or partially dissolved in the optional solvent. If an optional solvent is not used in the provided methods, the polymer material formed upon treatment with the organoborane will be either a liquid or solid. However, said liquid or solid may, in some embodiments, need to be dispersed, suspended, dissolved, or partially dissolved in a solvent in order to adequately form the provided coatings.

An organoborane free-radical initiator is capable of generating a free radical in the presence of oxygen and initiating addition polymerization and/or crosslinking. In some embodiments, a free radical may be generated (and polymerization initiated) upon heating of the organoborane initiator. In some embodiments, merely exposing the organoborane initiator to oxygen is sufficient to generate a free radical. In some embodiments, stabilized organoborane compounds, wherein the organoborane is rendered non-pyrophoric at ambient conditions, may be used with the provided methods.

In some embodiments, the organoborane free-radical initiator used with the provided methods may be selected from alkylborane-organonitrogen complexes that include, but are not limited to, trialkylborane-organonitrogen complexes comprising trialkylboranes having the formula $BR''_3$, wherein R" represents linear and branched aliphatic or aromatic hydrocarbon groups containing 1-20 carbon atoms. Examples of suitable trialkylboranes include, but are not limited to, trimethylborane, triethylborane, tri-n-butylborane, tri-n-octylborane, tri-sec-butylborane, tridodecylborane, and phenyldiethylborane. In other embodiments, an organoborane free-radical initiator may be selected from organosilicon-functional borane-organonitrogen complexes, such as those disclosed in WO2006073695 A1.

In some embodiments, it is contemplated that the organoborane free-radical initiator used with the provided methods may be an organoborane-organonitrogen complex having the formula:

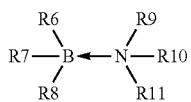

wherein B represents boron and N represents nitrogen; at least one of R6, R7, and R8 contains one or more silicon atoms with the silicon-containing group(s) covalently attached to boron; R6, R7, and R8 are groups that can be independently selected from hydrogen, a cycloalkyl group, a linear or branched alkyl group having 1-12 carbon atoms on the backbone, an alkylaryl group, an organosilane group such as an alkylsilane or an arylsilane group, an organosiloxane group, an alkene group capable of functioning as a covalent bridge to another boron atom, a divalent organosiloxane group capable of function as a covalent bridge to another boron atom, or halogen substituted homologs thereof; R9, R10, and R11 are groups that yield an amine compound or a polyamine compound capable of complexing with boron and are independently selected from hydrogen, an alkyl group containing 1-10 carbon atoms, a halogen substituted alkyl group containing 1-10 carbon atoms, or an organosilicon functional group; and at least two of the R6, R7, and R8 groups and at least two of the R9, R10, and R11 groups can combine to form heterocyclic structures, provided that the sum of the number of atoms from the two combining groups does not exceed 11.

Examples of suitable organonitrogens for forming an organoborane-organonitrogen complex include, but are not limited to, 1,3 propane diamine; 1,6-hexanediamine; methoxypropylamine; pyridine; isophorone diamine; and silicon-containing amines such as 3-aminopropyltrimethoxysilane, 3-aminopropyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxyethoxy)silane, N-(2-aminoethyl)-3-aminopropyltrimethoxysilane, N-(6-aminohexyl)aminomethyltrimethoxysilane, N-(2-aminoethyl)-hI-aminoundecyltrimethoxysilane, (aminoethylaminomethyl)-p-benethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

In some embodiments, nitrogen-containing compounds that may be useful for forming an organoborane-organonitrogen complexes may be selected from organopolysiloxanes having least one amine functional group. Examples of suitable amine functional groups include, but are not limited to, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Other nitrogen-containing compounds that may be useful for forming the organoborane-organonitrogen complexes for use as organoborane free-radical initiators in the provided methods may include, but are not limited to, N-(3-triethyoxysilylpropyl)-4,5-dihydroimidazole, ureidopropyltriethoxysilane, and organopolysiloxane resins in which at least one group is an imidazole, amidine, or ureido functional group.

In some embodiments, an organoborane free radical initiator for use in the provided methods may be a trialkylborane-organonitrogen complex wherein the trialkylborane is selected from triethylborane, tri-n-butylborane, tri-n-octylborane, tri-sec-butylborane, and tridodecylborane. For example, an initiator may be selected from triethylborane-propanediamine, triethylborane-butylimidazole, triethylborane-methoxypropylamine, tri-n-butyl borane-methoxypropylamine, triethylborane-isophorone diamine, tri-n-butyl borane-isophorone diamine, and triethylborane-aminosilane or triethylborane-aminosiloxane complexes. Good results have been obtained with use of TnBB-MOPA (tri-n-butyl borane complexed with 3-methoxypropylamine).

Although organonitrogen-stabilized organoborane compounds are particularly useful as free radical initiators, one of skill in the art will understand that other organoborane free radical initiators may be used. Examples may include, but are not limited to, ring stabilized compounds (such as 9-BBN), or solvent complexed organoboranes (such as trialkylborane-THF solutions).

In various embodiments, a free radical may be generated, and polymerization and/or crosslinking is initiated, by exposing the organoborane free radical initiator to air (or other oxygen source), heat, radiation, or combinations thereof. In the case of thermal activation, the temperature required to initiate polymerization and/or crosslinking reactions is dictated by the nature of the organoborane compound selected as the initiator. For example, if an organoborane-organonitrogen complex is selected, the binding energy of the complex will dictate the necessary temperature required to initiate dissociation of the complex and the reaction. In some embodiments, the organoborane free radical initiator and the reaction product of the silane and amine-reactive compound are heated together. In some embodiments, no heat is required to initiate polymerization and/or crosslinking.

Methods

The provided methods of preparing silicon-containing materials comprise reacting a free radical polymerizable amine-reactive compound with an amine-functional silane. Optionally, the reaction occurs in the presence of at least one solvent to form a reaction product that is soluble in the solvent. In various embodiments, a desirable reaction product may be formed when the mole ratio of the amine groups in the silane to the amine-reactive groups in the amine reactive compound is from about 0.5 to about 1.5. Accordingly, suitable mole ratios (amine groups/amine-reactive groups) may be 0.5-0.6, 0.6-0.7, 0.7-0.8, 0.8-0.9, 0.9-1.0, 1.0-1.1, 1.1-1.2, 1.2-1.3, 1.3-1.4, 1.4-1.5, and all points therein. Good results have been obtained when the mole ratio is from 1.0 to 1.5. The reaction product may be, but is not required to be, an amine-carboxylate salt or amide bridged complex. Regardless the nature of the reaction product, the provided methods allow for its formation in the absence of a surfactant or block copolymer, which is in contrast to conventional sol-gel methods.

The provided methods further comprise reacting the reaction product with an organoborane free-radical initiator to form a polymer preparation that can be used to prepare one or more of the provided coatings, solids, powders. Free radical generation requires oxygen, which may be present in the ambient air, dissolved in the precursor and/or organoborane compositions, or delivered from another oxygen source. In some embodiments, limiting the concentration of oxygen (but not precluding it from the system) such as by the use of a nitrogen sweep or purge may be advantageous for safety (reduced flammability of volatile fluids), for reaction efficiency, or both. In some embodiments, the polymer preparation formed after treatment with the organoborane initiator may be applied to at least one substrate surface and dried to form a silicon-containing coating. In some embodiments, the coating formed comprises microstructures that are responsive to one or more stimuli. Application of the polymer preparation to the substrate surface may be achieved by various techniques, including but not limited to, vapor deposition, liquid deposition, dip coating, flow coating, curtain coating, spin-on application, spray-on application, and roll-on application techniques. In some embodiments, the substrate is a sacrificial substrate and the provided methods allow for formation of a free-standing film.

In some embodiments, the silicon-containing coatings formed may be further treated with heat, acid, or both to form oxidized coatings. For example, oxidized coatings may be formed by treating a silicon-containing coating with high heat or at least one strong acid. As another example, oxidized coatings may be formed by treating a silicon-containing coating with at least one strong acid and low heat. In some embodiments, preparation of an oxidized coating comprises heating a provided silicon-containing coating to a temperature of from about 400° C. to about 1000° C. Accordingly, suitable temperatures may be 400° C.-450° C., 450° C.-500° C., 500° C.-550° C., 550° C.-600° C., 600° C.-650° C., 650° C.-700° C., 700° C.-750° C., 750° C.-800° C., 800° C.-850° C., 850° C.-900° C., 900° C.-950° C., 950° C.-1000° C., and all points therein. Good results have been obtained by heating to a temperature of from about 500° C. to about 700° C. Good results have also been obtained by heating to a temperature of from about 550° C. to about 650° C. In some embodiments, preparation of an oxidized coating comprises contacting a provided silicon-containing coating with at least one acid. Examples of suitable acids include, but are not limited to, strong acids such as hydrochloric (HCl), hydrobromic (HBr), hydroiodic (HI), nitric ($HNO_3$), perchloric ($HClO_4$), and sulfuric ($H_2SO_4$) acids. Good results have been obtained by using HCl.

In alternative embodiments, the polymer preparation formed after treatment with the organoborane initiator may be used to prepare an oxidized solid, powder, or combination thereof by directly treating the polymer preparation (i.e., without forming a coating) with heat, acid, or combinations thereof. In some embodiments, the polymer preparation may be directly treated with heat, acid, or combinations thereof to form an oxidized solid. For example, the polymer preparation of (II) may be directly treated with high heat or at least one strong acid. As another example, the polymer preparation of (II) may be treated with at least one strong acid and low heat. The oxidized solid formed may be granulated to form an oxidized powder. In alternative embodiments, a bulk solid may be formed by treating the polymer preparation of (II) with heat, vacuum, or combinations thereof. The bulk solid formed can be further treated with acid, heat, or combinations thereof to form an oxidized solid. For example, a bulk solid may be formed by heating the polymer preparation in the presence of a vacuum and then once formed, treated with high heat or at least one strong acid to form the oxidized solid. As another example, the polymer preparation can be heated to form a bulk solid and then once formed, treated with low heat and at least one strong acid to form the oxidized solid. The oxidized solid formed can be granulated to form an oxidized powder. Alternatively, an oxidized powder can be prepared by granulating a bulk solid and then treating the granulated solid with acid, heat, or combinations thereof.

Solids and Powders

In various embodiments, provided are bulk solids, oxidized solids, and oxidized powders prepared according to the provided methods. The bulk solids formed are non-porous or semi-porous and comprise surface microstructures, sub-surface microstructures, or both. Said microstructures may be tapered, cylindrical, conical, or have some other form or shape. The microstructures may also be responsive to one or more stimuli. Examples of stimuli that can illicit a response in the provided bulk solids include, but are not limited to, humidity, pH, and temperature. In some embodiments, the stimuli-responsive microstructures have a mean height or length (depending upon whether it is a surface protrusion or a sub-surface structure) of from about 5 to about 8 nm and a mean diameter of from about 0.8 to about 2.3 μm. Accordingly, a microstructure may have a mean height or length of from 5-5.5 nm, 5.5-6 nm, 6-6.5 nm, 6.5-7 nm, 7-7.5 nm, 7.5-8 nm, and all points therein. A microstructure may also have a mean diameter of from about 0.8-1.1 μm, 1.1-1.4 μm, 1.4-1.7 μm, 1.7-2 μm, 2-2.3 μm, and all points therein.

The provided oxidized solids and powders are porous. Such porous solids and powders may be one or more of microporous (having a mean pore diameter of less than 2 nm), mesoporous (having a mean pore diameter of from about 2 nm-50 nm), or macroporous (having a mean pore diameter of greater than 50 nm). It is contemplated that the oxidized solids and powders may be substantially microporous or comprise a substantial number of micropores. Thus, in some embodiments, the provided porous solids and powders may have a mean pore diameter selected from <1 nm, 1-1.2 nm, 1.2-1.4 nm, 1.4-1.6 nm, 1.6-1.8 nm, 1.8-2 nm, 2-5 nm, 5-10 nm, 10-15 nm, 15-20 nm, 20-25 nm, 25-30 nm, 30-35 nm, 35-40 nm, 40-45 nm, 45-50 nm, 50-70 nm, 70-90 nm, 90-110 nm, and all points therein. In some embodiments, the provided porous solids and powders may have a mean pore diameter greater than 110 nm. For example, it is contemplated that mean pore diameter may be selected from about 110-500 nm, 500-1000 nm (1 μm), 1-10 μm, 10-20 μm, 20-30 μm, 30-40 μm, and 40-50 μm.

Coatings

In various embodiments, provided are silicon-containing coatings prepared according to the provided methods. Said coatings may be non-porous or semi-porous, and in some embodiments, may comprise stimuli-responsive microstructures. Additionally provided are oxidized coatings wherein said silicon-containing coatings have been further treated (by treatment with heat, acid, or combinations thereof) to form pores of variable size. The porosity of an oxidized coatings may be selectable, based at least in part, upon the nature of the non-porous or semi-porous silicon-containing coating from which it is derived. For example, stimuli-responsive microstructures of a silicon-containing coating may be controlled by providing a stimulus prior to oxidation, thereby allowing for selectable porosity and pore structure in the oxidized coating. For example, the oxidized coating may be selected to be microporous.

In some embodiments, provided are silicon-containing coatings comprising microstructures. In some embodiments, such microstructures protrude from the coating surface. The microstructures may be tapered, cylindrical, conical, spherical, hemispherical or have some other form or shape. In some embodiments, the microstructures are responsive to one or more stimuli. Examples of stimuli that can illicit a response in the provided coatings include, but are not limited to, humidity, pH, and temperature. In some embodiments, the stimuli-responsive microstructures are protrusions having a mean height above the surface plane of from about 5 to about 8 nm and a mean diameter of from about 0.8 to about 2.3 µm. Accordingly, a protrusion may have a mean height of from 5-5.5 nm, 5.5-6 nm, 6-6.5 nm, 6.5-7 nm, 7-7.5 nm, 7.5-8 nm, and all points therein. A protrusion may also have a mean diameter of from about 0.8-1.1 µm, 1.1-1.4 µm, 1.4-1.7 µm, 1.7-2 µm, 2-2.3 µm, and all points therein.

In some embodiments, the silicon-containing coatings comprising stimuli-responsive microstructures respond to one or more stimuli by increasing surface roughness, decreasing surface roughness, changing microstructure or morphology, and combinations thereof. For example, microstructure shape may change in response to the one or more stimuli. As another example, microstructures may change from cylindrical protrusions to lamellar structures in response to the one or more stimuli. In some embodiments, properties of stimuli-responsive coatings prepared according to the provided methods may be selectively modified to provide desired characteristics. For example, one or more of adhesion, release, reflectivity, and friction may be selectively modified to meet the properties desired for an intended application. It is contemplated that coatings comprising such responsive microstructures may be used in a variety of applications.

In some embodiments, also provided are porous oxidized coatings prepared according to the provided methods. Such oxidized coatings may be selectively modified to provide desired characteristics, wherein such characteristics will be dependent, at least in part, upon the nature of the non-porous or semi-porous silicon-containing coating that is treated with heat, acid, or combinations thereof to form the oxidized coating. In some embodiments, the provided porous oxidized coatings may be one or more of microporous, mesoporous, or macroporous. It is contemplated that the oxidized coatings may be substantially microporous or comprise a substantial number of micropores. For example, a porous oxidized coating prepared according to the provided methods may have a mean pore diameter of less than 5 nm. Accordingly, such a coating may have a mean pore diameter of from 0-1 nm, 1-2 nm, 2-3 nm, 3-4 nm, 4-5 nm, and all points therein. It is contemplated that porous oxidized coatings prepared according to the provided methods may be used in a variety of applications.

In some embodiments, the provided non-porous or semi-porous coatings are films. Such films may be stand-alone films or substrate-bound films. Numerous methods of forming stand-alone and substrate-bound films are known. Substrate-bound non-porous or semi-porous films may be formed by application of the polymer preparation (or a dispersion thereof) to at least one surface of a substrate to form a film (if necessary, allowing the polymer preparation to dry). Stand-alone non-porous or semi-porous films may be formed by application of the polymer preparation to a surface of a sacrificial substrate and removing said substrate after formation of the film. In some embodiments, the provided stand-alone films or substrate-bound films comprise stimuli-responsive microstructures.

In some embodiments, the provided oxidized coatings are porous films. Such films may be stand-alone films or substrate-bound films. Numerous methods of forming stand-alone and substrate-bound films are known. Substrate-bound oxidized films may be formed by application of the polymer preparation (or a dispersion thereof) to at least one surface of a substrate to form a non-porous or semi-porous film (if necessary, allowing the polymer preparation to dry); then treating said film with heat, acid, or a combination thereof to form the oxidized film. Stand-alone oxidized films may be formed by application of the polymer preparation to at least one surface of a sacrificial substrate to form a non-porous or semi-porous film; treating said film with heat, acid, or a combination thereof to form the oxidized film; and mechanically removing said substrate after formation of the film. Alternatively, stand-alone oxidized films may be formed by application of the polymer preparation to at least one surface of a sacrificial substrate to form a non-porous or semi-porous film; treating said film with heat, acid, or a combination thereof to form the oxidized film; wherein said substrate is removed by the heat, acid, or combination thereof. Alternatively, stand-alone porous oxidized films may be formed by application of the polymer preparation to at least one surface of a sacrificial substrate to form a non-porous or semi-porous film; mechanically removing said substrate after formation of the film; and treating said stand-alone non-porous or semi-porous film with heat, acid, or a combination thereof to form the oxidized film.

Substrates

In various embodiments, provided are the coated substrates prepared according to the provided methods, wherein said substrates comprise: (i) at least one silicon-containing coating on at least one substrate surface; (ii) at least one silicon-containing on at least one substrate surface wherein the coating comprises stimuli-responsive microstructures; (iii) at least one oxidized coating on at least one substrate surface, or (iv) combinations thereof. In some embodiments, such the coatings on the provided substrates are films. In some embodiments, such substrates are sacrificial substrates used to form stand-alone films.

In some embodiments, provided are coated substrates comprising at least one non-porous or semi-porous silicon-containing coating comprising microstructures that protrude from the coating surface and are responsive to one or more stimuli. It is contemplated that substrates comprising such responsive coatings may be used in a variety of applications.

In some embodiments, provided are coated substrates comprising at least one oxidized coating that is porous, the properties of said coating dependent, at least in part, upon the nature of the non-porous or semi-porous silicon-containing coating from which it was derived. For example, pore size can, at least in part, be dependent upon by the nature of the non-porous or semi-porous silicon-containing coating. It is contemplated that substrates comprising such porous oxidized coatings may be used in a variety of applications.

EXAMPLES

The present invention will be better understood by reference to the following examples which are offered by way of illustration and which one of skill in the art will recognize are not meant to be limiting.

Example 1

In a glass vial, 4.01 g of a 50% solution of 3-aminopropyltriethoxysilane (Dow Corning) in PGMEA (propylene glycol methyl ether acetate; Aldrich) was mixed with 1.56 g of a 50% solution of methacrylic acid (Aldrich) in PGMEA. In a glass vial, 4.01 g of the mixture was mixed with 0.16 g of an organoborane initiator, TnBB-MOPA (tri-n-butyl borane complexed with 1.3 molar equivalents of 3-methoxypropylamine), to form a free radical-polymerized precursor material. The resulting precursor material was filtered through a 0.2 μm filter then spin coated onto a silicon wafer at 3300 rpm to form a continuous coating or film, except for a few pinhole defects.

When examined using atomic force microscopy (AFM) in tapping mode, the sample surfaces unexpectedly revealed an array of vertically aligned, fairly uniform cylindrical protrusions ranging from roughly 5 to 8 nm in height and 0.8 to 2.3 μm in diameter on a molecularly smooth background (root mean square roughness of 0.7 nm) as pictured in FIG. 2.

In contrast to the above methods, when only the 3-aminopropyltriethoxysilane/methacrylic acid mixture (i.e., without TnBB-MOPA) was spin-coated (after filtering through a 0.2 μm syringe filter) onto a silicon wafer at 3300 rpm for 30 seconds, the resulting film was unstable, undergoing rapid dewetting and leaving no continuous film. Thus, it was concluded that an organoborane initiator is necessary for preparation of the provided coatings and films.

Example 2

Figure 3A:
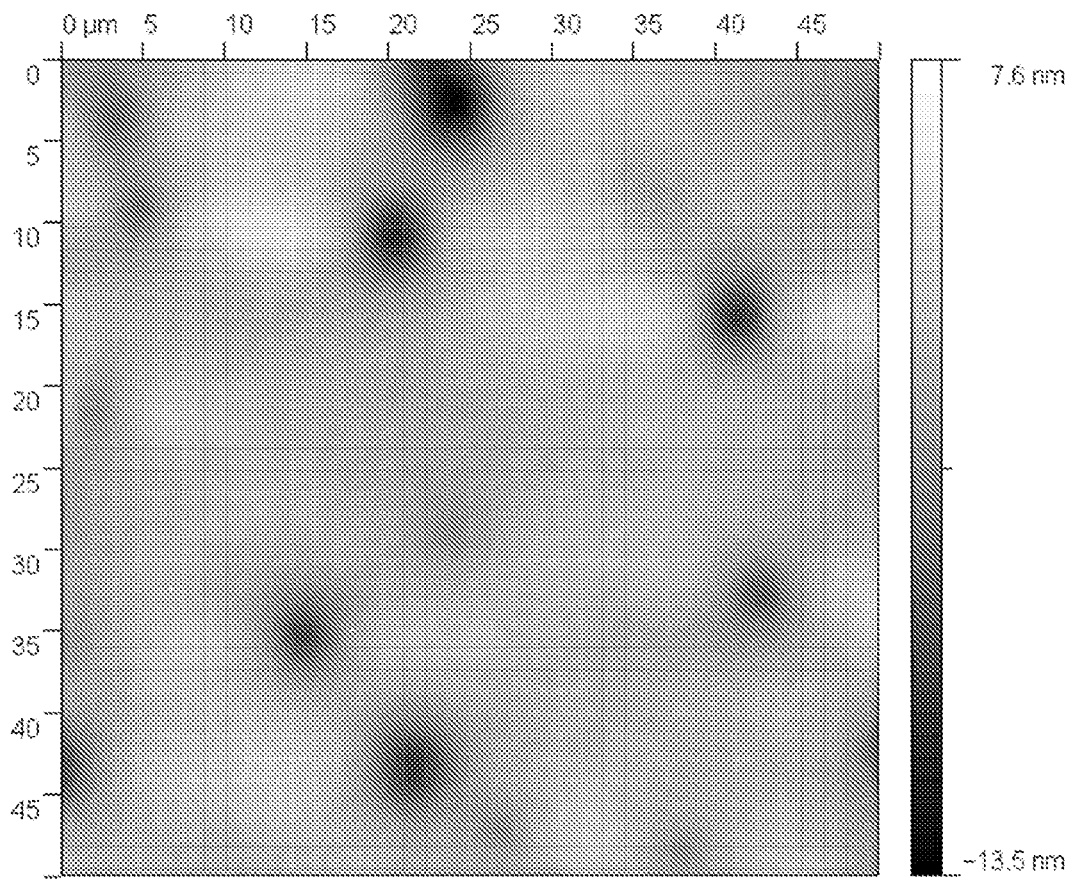
FIG. 3 depicts AFM (in tapping mode) height images of the silicon-containing film prepared by heat treating the film prepared in Example 1 for A 2 h/250° C. or for B 2 h/500° C.; C describes the microstructures of B.

A portion of the thin coating/film sample supported on the silicon wafer in Example 1 was placed in a forced air convection oven for 2 hours at 250° C. The resulting coating/film was characterized by AFM and revealed pores in the approximate locations where the cylindrical protrusions were present (FIG. 3A).

Example 3

Figure 3B:
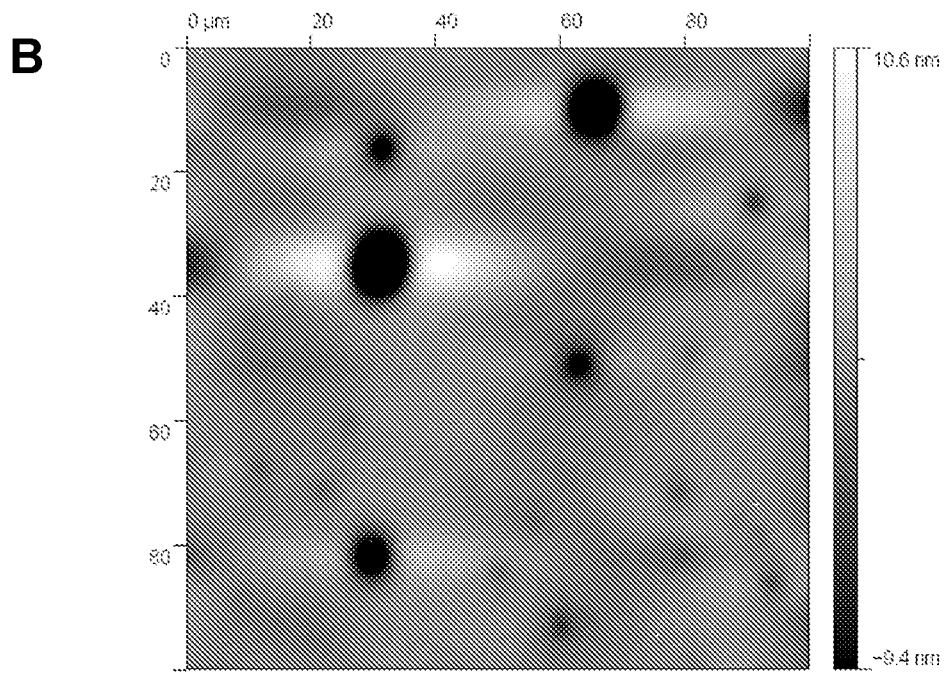
Figure 3C:
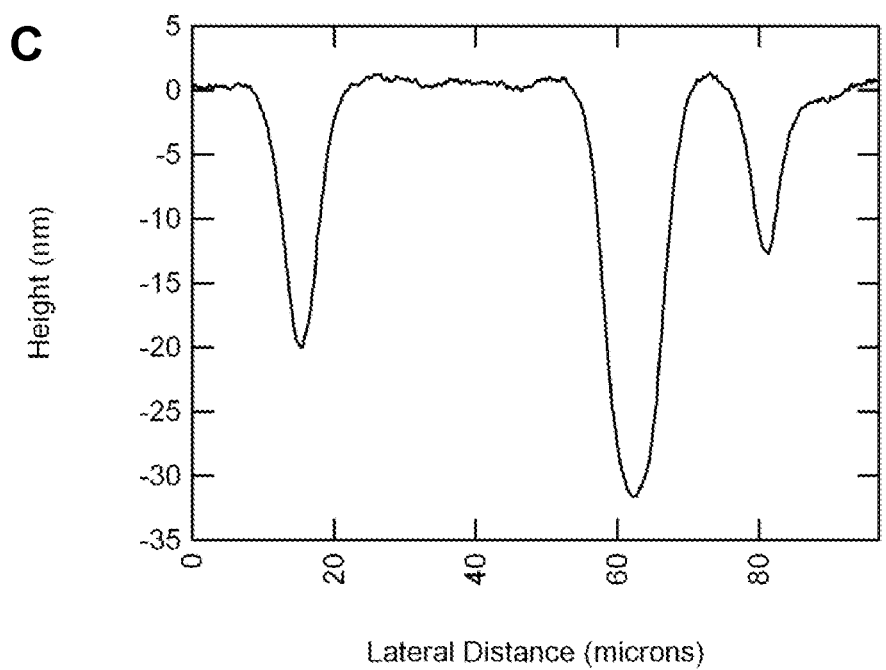

A portion of the thin coating/film sample supported on the silicon wafer in Example 1 was placed in a high temperature oven for 2 hours at 500° C. The resulting coating/film was characterized by AFM and revealed circular depressions or pores in the approximate locations where the cylindrical microstructures were present in Example 1 (FIG. 3B-C).

Example 4

Figure 4A:
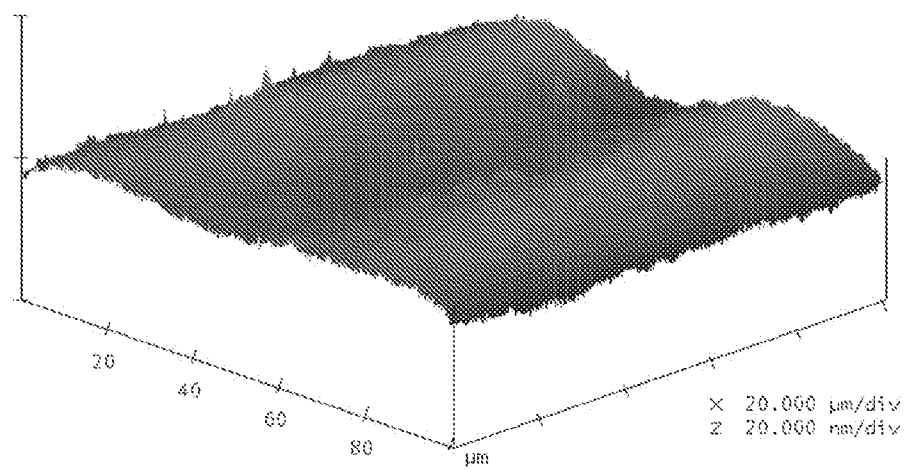
FIG. 4 depicts 3-D AFM images of Examples 4-6: A represents the film described in Example 4; B represents the film described in Example 5; and C represents the film described in Example 6; wherein the x-axis scale is 10 μm and the z-axis scale is 20 nm in all images.

In a glass vial, 2.01 g of a 50% solution of 3-aminopropyltriethoxysilane (Dow Corning) in PGMEA was mixed with 0.65 g of a 50% solution of acrylic acid (Aldrich) in PGMEA. Next, 1.64 g of the mixture was mixed in another glass vial with 0.099 g of TnBB-MOPA to form a free radical-polymerized precursor material. The resulting precursor polymeric material was filtered through a 0.2 μm filter then spin coated onto a silicon wafer at 3300 rpm for 30 s to form a continuous coating/film that had root mean square roughness of 1.4 nm by AFM, as shown in FIG. 4A.

Example 5

Figure 4B:
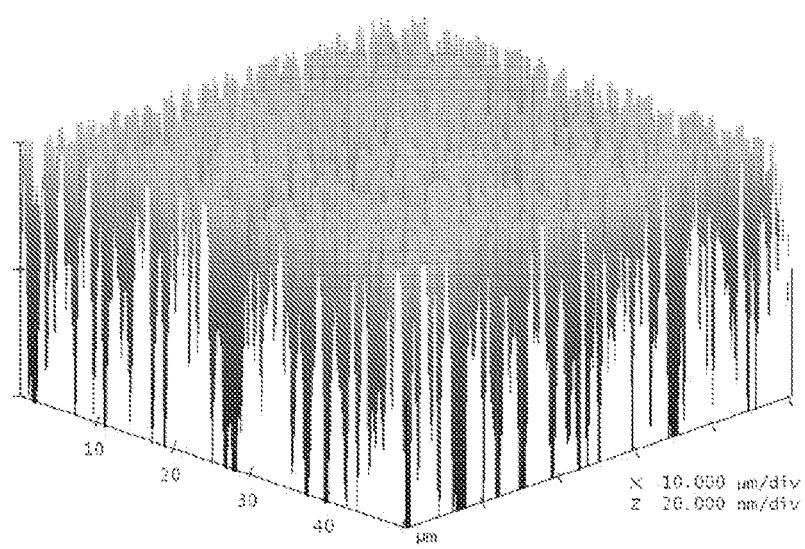

The silicon supported thin coating/film sample from Example 4 was subjected to 250° C. for 2 hours in a forced air convection oven. When examined by AFM, the resulting coating/film had vertically oriented microstructures with spherical surfaces. Examined over a larger width in 3-D mode, the vertical microstructures showed an aligned mesoporous assembly perpendicular to the surface as shown in FIG. 4B.

Example 6

Figure 4C:
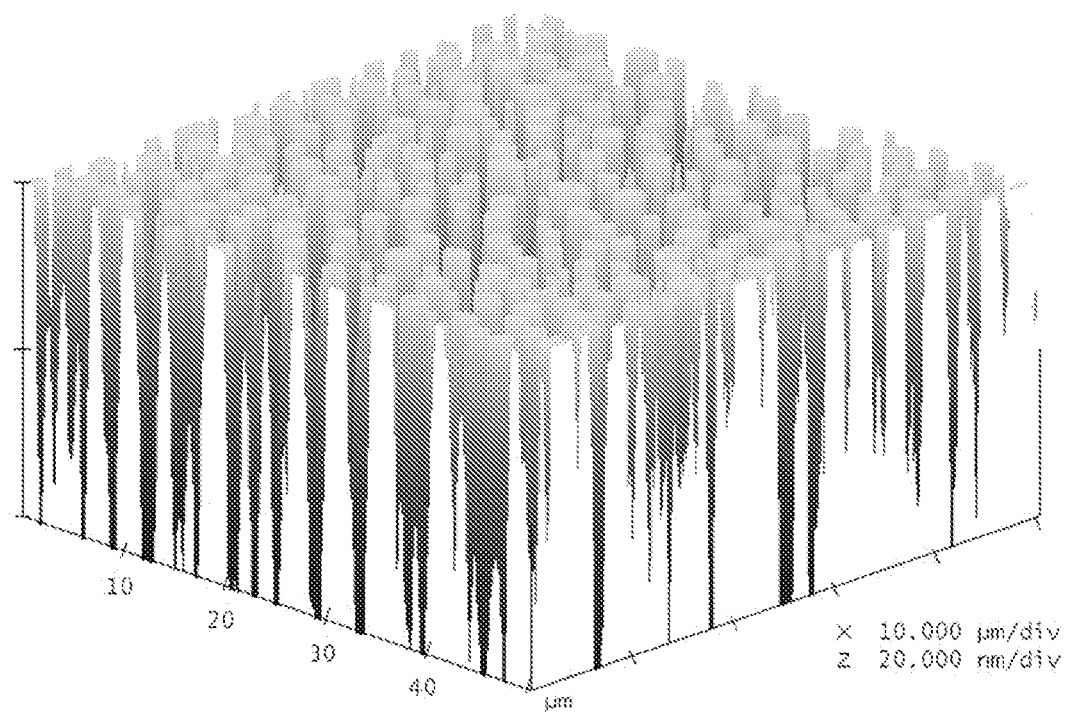
Figure 5A:
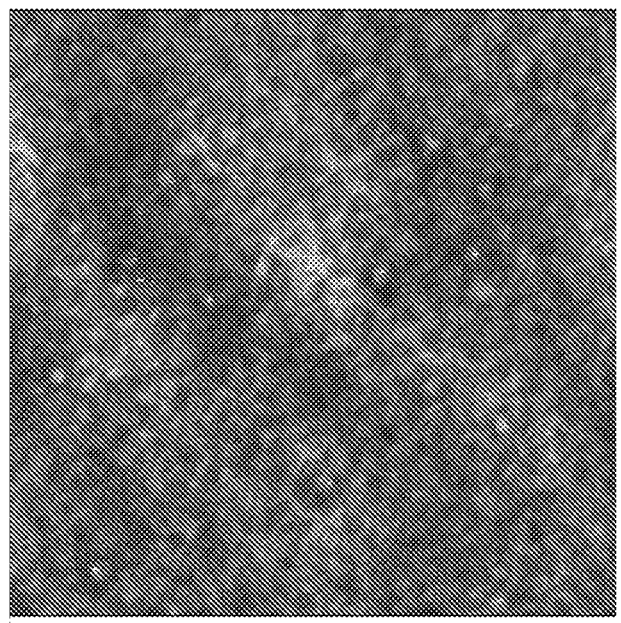
FIG. 5 depicts AFM images (x-y range 50 nm) of Example 7 films upon indirect exposure to water vapor for A 5 min (ht. z-range 20 nm) and B 45 min (ht. z-range 200 nm)
Figure 5A:
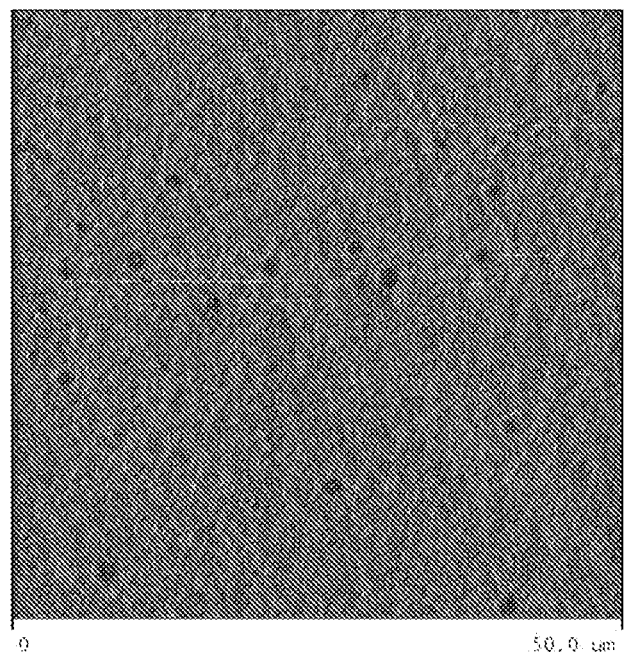
Figure 5B:
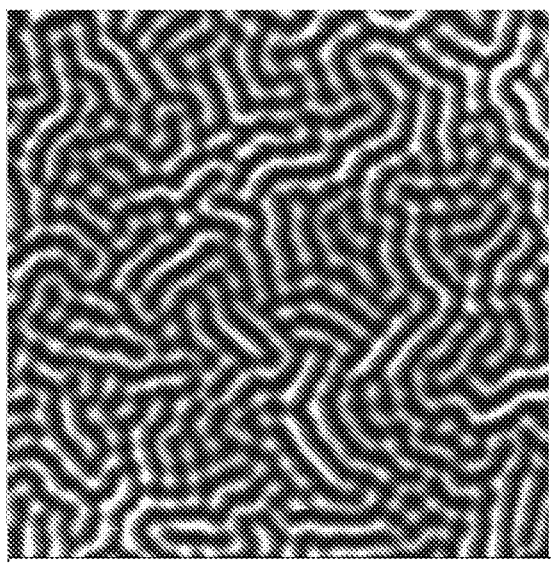
Figure 5B:
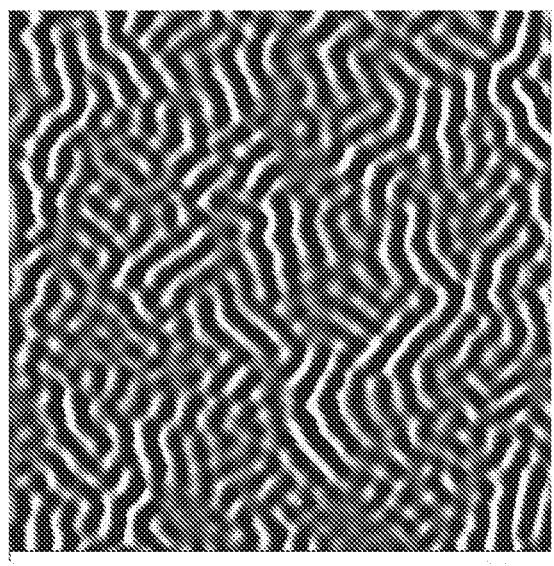

The silicon supported thin coating/film sample from Example 4 was subjected to 500° C. for 2 hours in a high temperature oven. When examined by AFM, the resulting coating/film had vertically oriented microstructures with spherical surfaces. Examined over a larger width in 3-D mode, the vertical microstructures show an aligned mesoporous assembly perpendicular to the surface as shown in FIG. 4C.

Example 7

The coating/film of Example 4 was tested after several weeks of ambient aging then placed in a humidity chamber that was fabricated from a 6 cm-tall jar filled approximately ¾ full with deionized water, and topped with an upside-down beaker. The coating/film sample was placed at the base of this chamber and exposed to the humid environment for a period of time. It was then removed, imaged by AFM, and replaced for an additional period of time. This cycle was repeated up to a total exposure time of 45 minutes. In this series of experiments, no attempt was made to return to the same area during subsequent imaging steps.

Figure 6A:
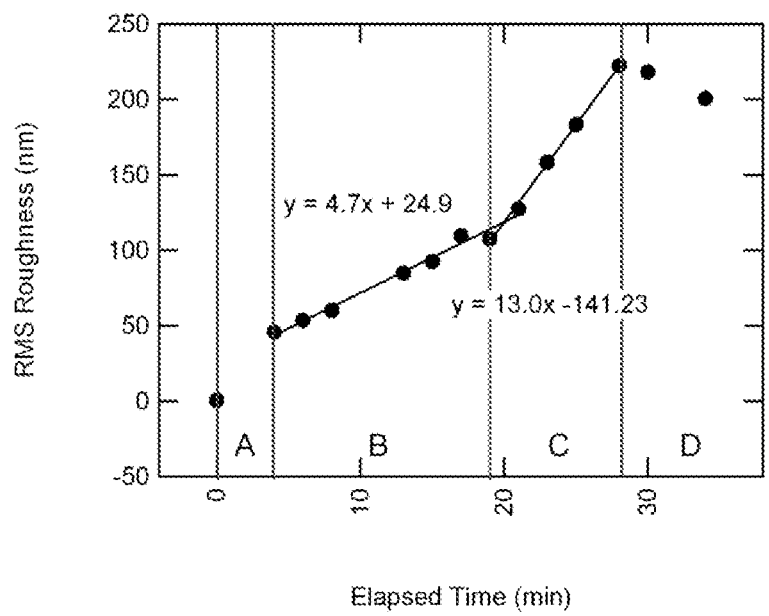
FIG. 6 illustrates fast evolution of microstructure sizes in the films of Example 7 (depicted in FIG. 5) as quantified by AFM with time of indirect exposure to water vapor: A root mean square roughness (RMS) and B cylindrical asperity height.
Figure 6B:
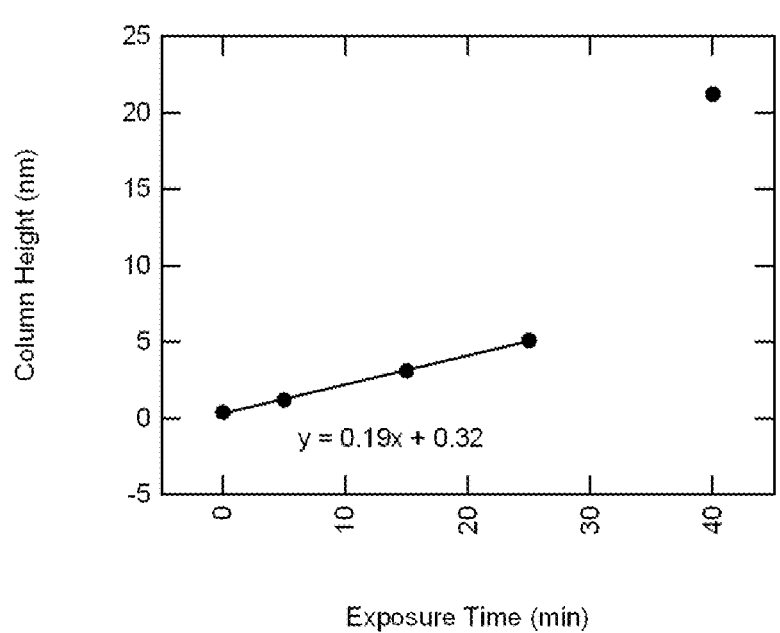

The microstructures of the coating/film were observed to expand with time of exposure to humidity and ultimately change from cylindrical microstructures into worm-like lamellar features after 45 minutes, as seen in FIG. 5. The coating/film roughness and height were measured in in-situ experiments and plotted, showing a controllable monotonic growth in microstructure sizes with time of exposure (FIG. 6).

This experiment demonstrates that the provided methods result in silicon-containing coatings and films that can exhibit a strong response to humidity, and that the microstructure of a given coating/film can be controlled simply by exposure time to humidity.

Example 8

In a glass vial, an equimolar mixture of 3-aminopropyltriethoxysilane (Dow Corning) and methacrylic acid (Aldrich) was prepared by mixing 12.06 g of 3-aminopropyltriethoxysilane and 4.69 g methacrylic acid with a dry nitrogen purge. The exotherm was controlled by placing the vial in a beaker of cool water to prevent excessive heating of the mixture. To 5.11 g of this mixture in a weighing dish was added 0.20 g of TnBB-MOPA and stirred with a magnetic stirrer. The sample polymerized within a few minutes into a clear gel. The material was transferred to a $N_2$-purged dry box to complete polymerization.

1.13 g of the polymerized material was transferred into a glass jar and placed in a 500° C. furnace for 2 hours before the furnace was turned off and allowed to return to room temperature overnight. The resulting solid was tested by nitrogen adsorption studies using a Quantachrom Autosorb 1 surface area analysis apparatus and exhibited a Type I isotherm with results shown in Table 1.

Example 9

Figure 7:
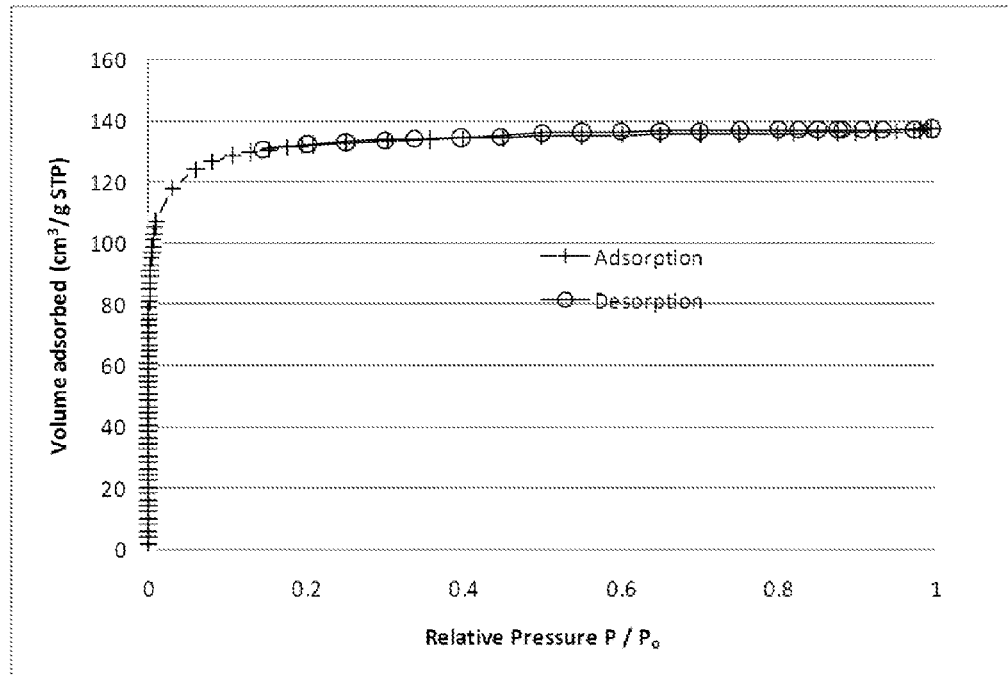
FIG. 7 illustrates nitrogen adsorption isotherms for the microporous powders of Examples 8 and 9, which show Type I behavior (IUPAC classification as defined for example on pp. 12-13 of "Characterization of Porous Solids and Powders: Surface Area, Pore Size and Density" by S. Lowell et al., Springer, 2004, The Netherlands).

72.136 g of an equimolar mixture of 3-aminopropyltriethoxysilane and methacrylic acid (Aldrich) made using water-jacketed glass reactor was combined with 2.864 g TnBB-MOPA and mixed in a mixing cup using a Hauschild centrifugal mixer for 30 s, followed by two intermittent 45 s mixing cycles. The material was transferred to a $N_2$-purged dry box and allowed to polymerize into a clear gel. The resulting product was transferred to a ceramic crucible and placed in a 600° C. furnace for 7 hours before the furnace was turned off and allowed to return to room temperature overnight. The resulting powder was tested by nitrogen adsorption studies using a Micromeritics ASAP 2020 model surface area analyzer. The resulting $N_2$ adsorption results are shown in FIG. 7 and Table 1.

TABLE 1

Nitrogen adsorption data for Examples 8 and 9

| Example | Surface area (m2/g) | t-plot micropore area (m2/g) | t-plot external area (m2/g) | Isotherm Type (IUPAC Classification) | Pore size (nm) |
|---|---|---|---|---|---|
| 8 | 408 | 395 | 80 | Type I | <2.0 |
| 9 | 418 | 335 | 83 | Type I | 1.0 |

The nitrogen adsorption isotherms from Examples 8 and 9 exhibit Type I behavior (IUPAC classification) which is characteristic of microporous solids, as shown in FIG. 7. These results demonstrate that the pyrolysis product of the method of this invention gives rise to a very fine internal pore structure (microporous or microporous with partial mesoporosity) that is very different from common silicas and materials derived from conventional sol-gel techniques.

Example 10

In a glass vial, an equimolar mixture of 3-aminopropyltris(trimethylsiloxy)silane (Gelest) and methacrylic acid (Aldrich) was prepared dropwise addition of 2.2 g of methacrylic acid to 9.2 g of 3-aminopropyltris(trimethylsiloxy)silane with a dry nitrogen purge. The exotherm was controlled by placing the vial in an ice bath to prevent excessive heating of the mixture. The mixture formed a soluble solid that was made into a 20 wt % solution in anhydrous toluene.

Example 11

To 2.0 g of the 20 wt % toluene solution of Example 10 was added 0.1 g of TnBB-MOPA. The headspace was purged with dry nitrogen for a few seconds before capping lightly to allow reaction. The reaction mixture remained clear and continued to thicken in viscosity over the next 6 hours. The resulting solution was coated onto a glass slide using a 5 mil doctor blade, and the solvent was evaporated with a heat gun leaving behind a transparent solid film. A drop of water placed on the film formed a significantly higher contact angle than on the glass slide.

Example 12

To 2.0 g of the 20 wt % toluene solution of Example 10 was added 0.023 g of glacial acetic acid and swirled lightly to mix. To this solution was added 0.1 g of TnBB-MOPA. The headspace was purged with dry nitrogen for a few seconds before capping lightly to allow reaction. The reaction mixture remained immediately thickened and eventually formed a translucent solution. The solution was coated onto a glass slide using a 5 mil doctor blade, and the solvent was evaporated with a heat gun leaving behind a solid film. A drop of water placed on the film formed a significantly higher contact angle than on the glass slide. After about 2 minutes of contact, the water droplet was removed from the surface and left behind a visibly swollen, whitened imprint within the contact area indicating a response to the water.

Example 13

In a glass vial, an equimolar mixture of 3-aminopropyltriethoxysilane and methacryloyl chloride (Alfa Aesar) was prepared by controlled addition of 1.8 g of methacryloyl chloride to 3.9 g of 3-aminopropyltriethoxysilane to form a stable viscous amber colored clear liquid product.

Example 14

To 1.0 g of the reaction product of Example 13 was added 0.05 g TnBB-MOPA in a glass vial. Upon mixing, a heat rise could be detected through the vial wall, indicating initiation of polymerization. The neat reaction product was a clear, amber colored solid.

Example 15

To 1.4 g of the reaction product of Example 13 was added 1.4 g of anhydrous toluene to form a clear solution. To 2.6 g of this solution was added 0.1 g of TnBB_MOPA. The resulting solution was spin coated onto a silicon wafer at 3300 rpm for 30 seconds to form a continuous coating. The film was placed in a nitrogen purged dry box. Upon exposure of a small area of the film to a high humidity air stream (over 90% relative humidity), the exposed area responded by taking on a hazy appearance that was distinct from the unexposed surrounding area. When a control untreated silicon wafer was exposed to the same humid air stream, the haze disappeared rapidly upon removal to ambient air. In contrast, the exposed area of the film of this example retained the haze for a prolonged period after returning to ambient air.

Example 16

To 2.0 g of the reaction product of Example 13 was added 5.3 g of anhydrous toluene to form a clear solution. To 2.5 g of this solution was added 0.1 g of TnBB_MOPA. The resulting solution was spin coated onto a silicon wafer at 3300 rpm for 30 seconds to form a continuous coating. The resulting film was then exposed to vapors of glacial acetic acid by suspending the substrate over the surface of a container of glacial acetic acid in a nitrogen purged dry box. The resulting film spontaneously developed a pattern. The film was left in the nitrogen purged drybox overnight. The resulting surface was resistant to wiping by a laboratory wipe and under an optical microscope was revealed to be comprised substantially of an array of solid hemispherical microdroplets ranging from approximately 50-100 μm in diameter.

The present invention should not be considered limited to the specific examples described herein, but rather should be understood to cover all aspects of the invention. Various modifications and equivalent processes, as well as numerous structures and devices, to which the present invention may be applicable will be readily apparent to those of skill in the art. Those skilled in the art will understand that various changes may be made without departing from the scope of the invention, which is not to be considered limited to what is described in the specification.

The invention claimed is:
1. A method of preparing silicon-containing materials, comprising:
(I) reacting an amine-reactive compound having at least one free-radical polymerizable group per molecule with a silane to form a reaction product, the silane having the formula:

$$(R^1{}_2NR^2)_a SiR^3{}_b(OR^4)_{4-(a+b)}$$

wherein
a=1, 2, or 3; b=0, 1, 2, or 3; a+b=1, 2, 3, or 4;
each $R^1$ is independently selected from hydrogen, C1-C12 alkyl, halogen-substituted C1-C12 alkyl, C1-C12 cycloalkyl, aryl, nitrogen-substituted C1-C12 alkyl, and aliphatic ring structures which bridge the $R^1$ units, wherein the aliphatic ring structures are optionally N-substituted;
each $R^2$ is independently selected from C1-C30 alkyl;
each $R^3$ is independently selected from hydrogen, halogen, C1-C12 alkyl, halogen-substituted C1-C12 alkyl, and —$OSiR^{3'}{}_3$, wherein $R^{3'}$ is selected from C1-C12 alkyl and halogen-substituted C1-C12 alkyl; and
each $R^4$ is independently selected from hydrogen, C1-C12 alkyl, and halogen-substituted C1-C12 alkyl;
wherein a mole ratio of amine groups on the silane to amine-reactive groups on the amine-reactive compound is from 0.5 to 1.5;
wherein the reaction may optionally occur in the presence of at least one optional solvent to form a reaction product that is soluble in the at least one optional solvent; and
(II) combining the reaction product of (I) with an organoborane-organonitrogen complex in the presence of oxygen to form a polymer preparation,
wherein the polymer preparation of (II) is selected from (a) a solid; (b) a liquid; or if the reaction of (I) occurs in the presence of the at least one optional solvent, (c) a dispersion.

2. A method according to claim 1, further comprising forming a silicon-containing coating by (a) contacting at least one substrate surface with a polymer preparation of (II); or (b) contacting at least one substrate surface with a polymer preparation of (II) dispersed in at least one solvent.

3. A method according to claim 2, further comprising forming an oxidized coating by (a) heating the silicon-containing coating; (b) contacting the silicon-containing coating with at least one acid; or (c) combinations thereof.

4. A method according to claim 3, wherein the oxidized coating is porous or substantially microporous.

5. A method according to claim 3, wherein the silicon-containing coating is heated to a temperature of from about 400° C. to about 1000° C.

6. A method according to claim 1, further comprising forming a bulk solid by heating a polymer preparation of (II), optionally under vacuum.

7. A method according to claim 1, further comprising forming an oxidized solid by (a) heating a polymer preparation of (II); (b) contacting a polymer preparation of (II) with at least one acid; or (c) combinations thereof.

8. A method according to claim 7, wherein the oxidized solid is porous or substantially microporous.

9. A method according to claim 6, further comprising forming an oxidized solid by (a) heating a bulk solid; (b) contacting a bulk solid with at least one acid; or (c) combinations thereof.

10. A method according to claim 9, wherein the oxidized solid is porous or substantially microporous.

11. A method according to claim 6, further comprising forming an oxidized powder by granulating a bulk solid to form a powder and (a) heating the powder formed, (b) contacting the powder formed with at least one acid, or (c) combinations thereof.

12. A method according to claim 1, wherein the reaction of (I) occurs in the presence of at least one solvent selected from toluene, xylene, linear siloxanes, cyclosiloxanes, hexamethyldisiloxane, octamethyltrisiloxane, pentamethyltetrasiloxane, ethyl acetate, propylene glycol methyl ether acetate, di(propyleneglycol)dimethyl ether, methylethyl ketone, methylisobutylketone, methylene chloride, tetrahydrofuran, 1,4-dioxane, N-methyl pyrollidone, N-methylformamide, dimethylsulfoxane, N,N-dimethylformamide, propylene carbonate, water, and any combination thereof.

13. A method according to claim 1, wherein the amine-reactive compound is selected from acrylic acid, methacrylic acid, 2-carboxyethylacrylate, 2-carboxyethylmethacrylate, acryloyl chloride, methacryloyl chloride, glycidyl acrylate, glycidyl methacrylate, and any combination thereof.

14. A method according to claim 1, wherein the silane is selected from aminomethyltriethoxysilane; aminomethyltrimethoxysilane; 3-aminopropyltriethoxysilane; 3-aminopropyltrimethoxysilane; 3-aminopropylmethyldimethoxysilane; 3-aminopropylmethyldiethoxysilane; 3-aminopropylethyldimethoxysilane; 3-aminopropylethyldiethoxysilane; 3-aminopropyl dimethylmethoxysilane; 3-aminopropyldiethylmethoxysilane; 3-aminopropyl dimethylethoxysilane; 3-aminopropyldiethylethoxysilane; n-butylaminopropyltrimethoxysilane; 4-aminobutyltriethoxysilane; 4-aminebutyltrimethoxysilane; aminophenyltrimethoxysilane; N,N-diethyl-3-aminopropyltrimethoxysilane; N-(2-aminothyl)-3-aminopropyltrimethoxysilane; 3-aminopropyl trimethylsilane, m-aminophenyltrimethoxysilane, p-aminophenyltrimethoxysilane, 11-aminoundecyltriethoxysilane; 2-(4-pyridylethyl)triethoxysilane, 3-aminopropyltris(trimethylsiloxy)silane, and any combination thereof.

15. A method according to claim 1, wherein the organoborane-organonitrogen complex is a trialkylborane-organonitrogen complex selected from triethylborane-propanediamine, triethylborane-butylimidazole, triethylborane-methoxypropylamine, tri-n-butyl borane-methoxypropylamine, triethylborane-isophorone diamine, tri-n-butyl borane-isophorone diamine, triethylborane-aminosilanes, triethylborane-aminosiloxanes, and any combination thereof.

16. A silicon-containing coating prepared according to the method of claim 2, or
a silicon-containing coating prepared according to the method of claim 2, further comprising microstructures that are responsive to one or more stimuli.

17. An oxidized coating prepared according to the method of claim 3.

18. A bulk solid prepared according to the method of claim 6, comprising microstructures that are responsive to one or more stimuli.

19. A coated substrate comprising a substrate with at least one surface and the silicon-containing coating of claim 16 on at least one substrate surface.

20. A coated substrate comprising a substrate with at least one surface and the oxidized coating of claim 17 on at least one substrate surface.

\* \* \* \* \*